(12) United States Patent
Okumura et al.

(10) Patent No.: US 10,704,668 B2
(45) Date of Patent: Jul. 7, 2020

(54) AIR BREATHER CHAMBER STRUCTURE

(71) Applicants: JATCO Ltd, Fuji-shi, Shizuoka (JP); NISSAN MOTOR CO., LTD., Yokohama-shi, Kanagawa (JP)

(72) Inventors: Yutaka Okumura, Numazu (JP); Naoto Sato, Gotemba (JP); Eiji Sasaki, Fujinomiya (JP); Toshikazu Suzuki, Fuji (JP); Hirona Matsubara, Fuji (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/334,212

(22) PCT Filed: Jul. 27, 2017

(86) PCT No.: PCT/JP2017/027276
§ 371 (c)(1),
(2) Date: Mar. 18, 2019

(87) PCT Pub. No.: WO2018/055904
PCT Pub. Date: Mar. 29, 2018

(65) Prior Publication Data
US 2019/0277394 A1 Sep. 12, 2019

(30) Foreign Application Priority Data
Sep. 26, 2016 (JP) .................. 2016-187419

(51) Int. Cl.
*F16H 57/04* (2010.01)
*F16H 57/027* (2012.01)

(52) U.S. Cl.
CPC ....... *F16H 57/027* (2013.01); *F16H 57/0424* (2013.01)

(58) Field of Classification Search
CPC ...... F16H 57/02; F16H 57/027; F16H 57/029; F16H 57/042; F16H 57/0424
See application file for complete search history.

(56) References Cited

U.S. PATENT DOCUMENTS

| 4,468,979 | A | * | 9/1984 | Inagaki | F16H 37/021 |
| | | | | | 74/606 R |
| 10,371,245 | B2 | * | 8/2019 | Tanaka | F16H 57/027 |
| 2010/0116087 | A1 | * | 5/2010 | Mueller | F16H 57/027 |
| | | | | | 74/606 R |

FOREIGN PATENT DOCUMENTS

| JP | 09273621 A * 10/1997 | ........... F16H 57/027 |
| JP | H10-205609 A   8/1998 | |

(Continued)

*Primary Examiner* — Adam D Rogers
(74) *Attorney, Agent, or Firm* — Foley & Lardner LLP

(57) ABSTRACT

An air breather chamber structure includes: a first breather chamber provided to a housing receiving a transmission; and a second breather chamber provided to an upper portion of the housing in a gravity direction, the first introduction hole being positioned on the first side of the imaginary surface, the second introduction hole being positioned on the second side of the imaginary surface, the atmosphere communication hole being positioned on the first side of the imaginary surface, the discharge hole being positioned on the second side of the imaginary surface, the first introduction hole and the discharge hole being positioned below the second introduction hole in the gravity direction, and the atmosphere communication hole being positioned above the second introduction hole in the gravity direction.

3 Claims, 3 Drawing Sheets

(56) References Cited

FOREIGN PATENT DOCUMENTS

| JP | 2005291263 A | * | 10/2005 | ............ | F16H 57/027 |
| WO | WO-2015011976 A1 | * | 1/2015 | ............ | B60K 7/0007 |

* cited by examiner

AIR BREATHER CHAMBER STRUCTURE

TECHNICAL FIELD

This invention relates to a structure of an air breather chamber provided to a transmission.

BACKGROUND ART

Conventionally, in a patent document 1, an air breather chamber includes an atmosphere communication hole provided above the air breather chamber; and a connection portion formed below the air breather chamber to drain a lubricating oil. With this, the oil flowing into the air breather chamber is smoothly discharged from the connection hole.

However, further improvements have been requested for handling the increase of the amount of the lubricating oil flowing into the air breather chamber.

It is, therefore, an object of the present invention to provide an air breather chamber structure which can attain functions of the air breather chamber even when the amount of the lubricating oil flowing into the air breather chamber is increased.

PRIOR ART DOCUMENT

Patent Document

Japanese Patent Application Publication No. 10-205609

SUMMARY OF THE INVENTION

An air breather chamber structure according to the present invention comprises:

a first breather chamber which is provided to a housing receiving a transmission, and which includes a first introduction hole connected to an inside of the housing; and a second breather chamber which is provided to an upper portion of the housing in a gravity direction, and which includes a second introduction hole connected to the first breather chamber, an atmosphere communication hole connected to an outside of the housing, and a discharge hole connected to the inside of the housing, and arranged to discharge a lubricating oil, an imaginary surface passing through a rotation axis of the transmission, and extending in the gravity direction being defined, a first side being defined by one side of the imaginary surface, a second side being defined by the other side of the imaginary surface, the first introduction hole being positioned on the first side of the imaginary surface, the second introduction hole being positioned on the second side of the imaginary surface, the atmosphere communication hole being positioned on the first side of the imaginary surface, the discharge hole being positioned on the second side of the imaginary surface, the first introduction hole and the discharge hole being positioned below the second introduction hole in the gravity direction, and the atmosphere communication hole being positioned above the second introduction hole in the gravity direction.

By this structure, it is possible to ensure a distance between the second introduction hole and the air connection hole, and to effectively attain the functions of the air breather chamber even when the amount of the lubricating oil is increased.

DESCRIPTION OF EMBODIMENTS

Figure 1:
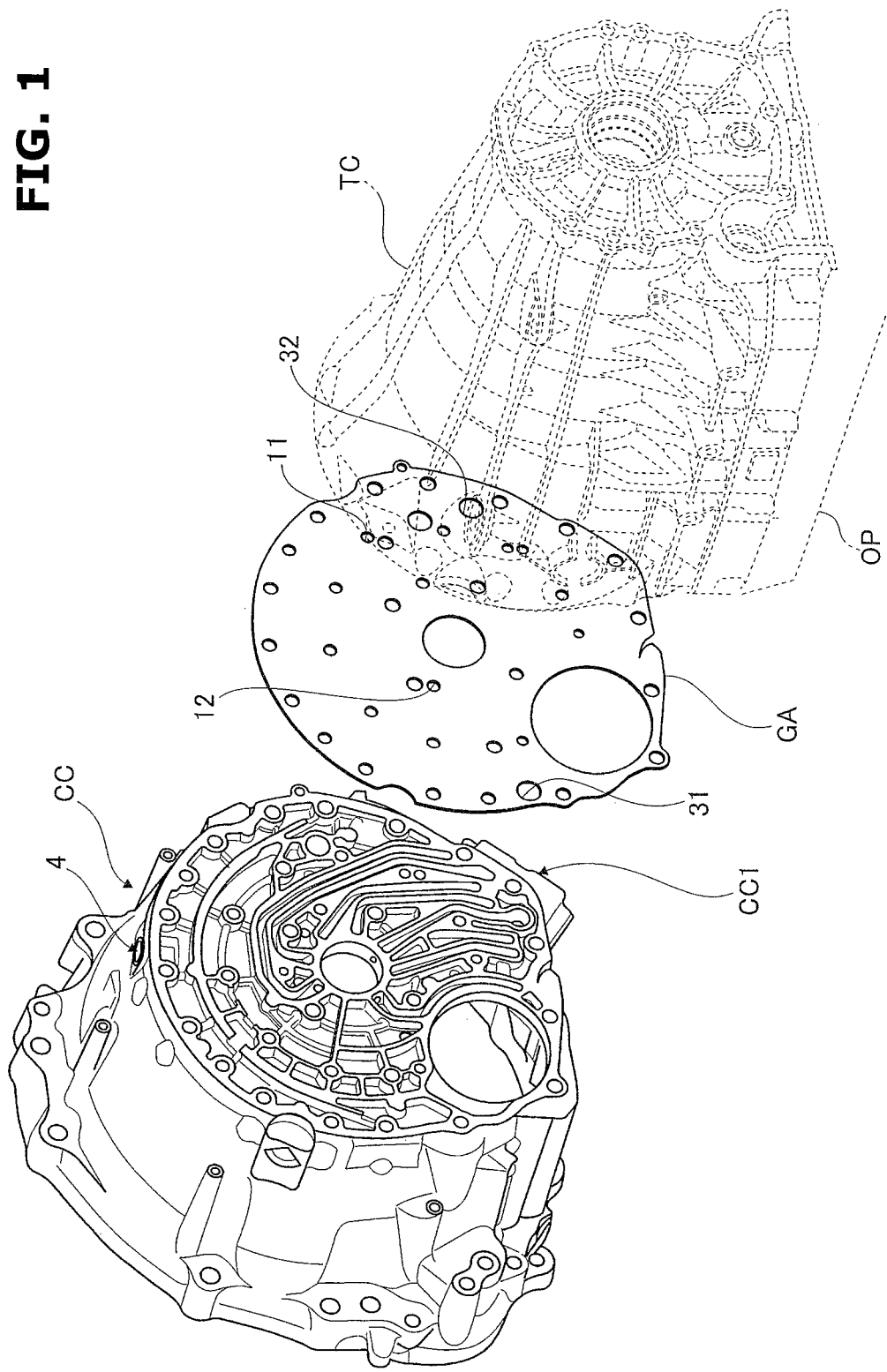
FIG. 1 is a schematic perspective view showing a housing of a transmission provided with an air breather chamber according to an embodiment.

FIG. 1 is a schematic exploded perspective view showing a housing of a transmission for a vehicle which includes an air breather chamber according to the embodiment. This transmission includes a housing including a converter cover CC receiving a torque converter; and a transmission case TC receiving a planetary gear mechanism, a clutch and so on. The transmission case TC is connected through a gasket GA to a connection surface CC1 of the converter cover CC. An oil pan OP is mounted to a lower portion of the transmission case TC in a gravity direction. The oil pan OP receives a control valve unit, and stores lubricating oil.

Figure 2:
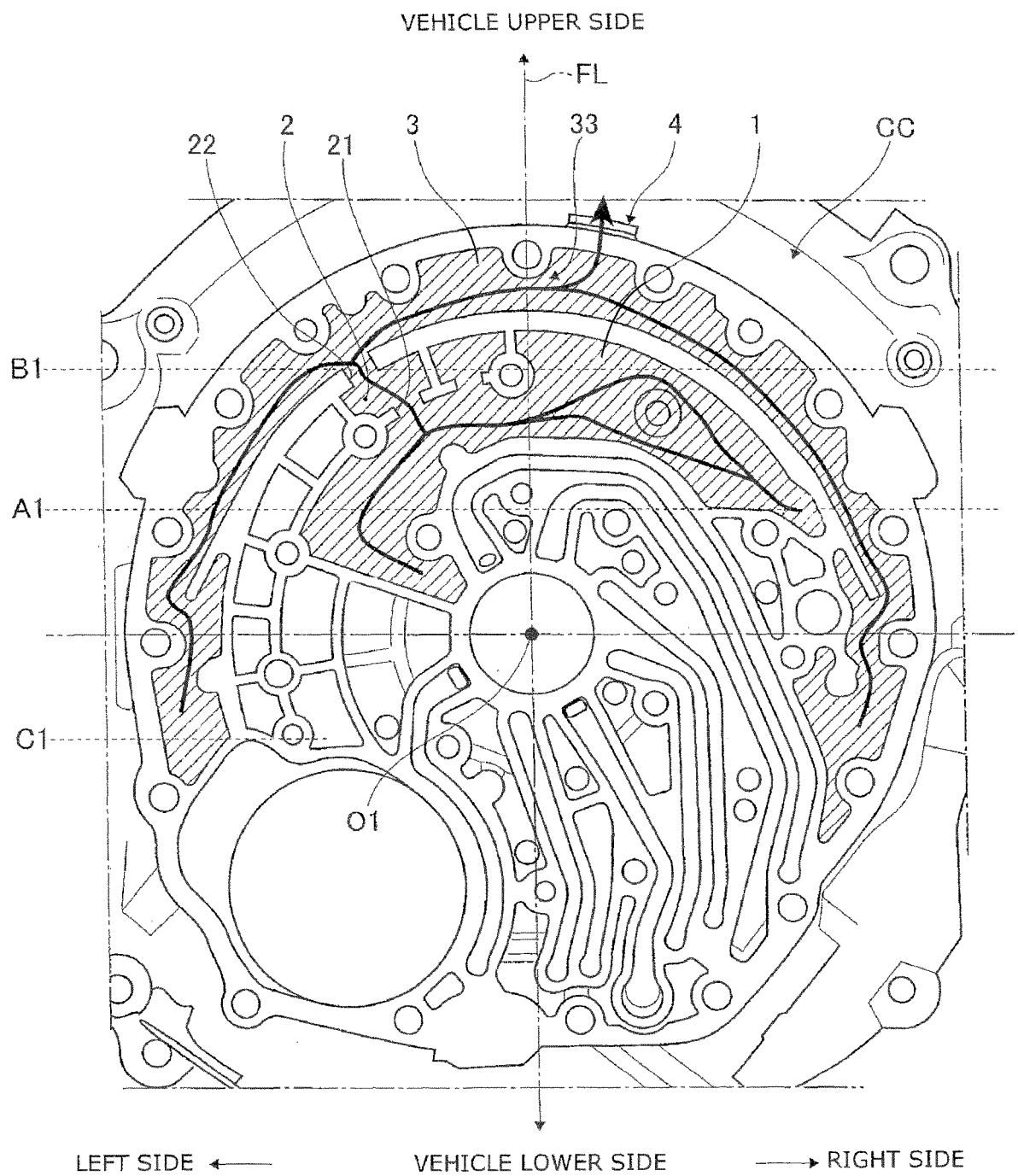
FIG. 2 is a front view showing a converter cover according to the embodiment, when viewed from a side of the air breather chamber.
Figure 3:
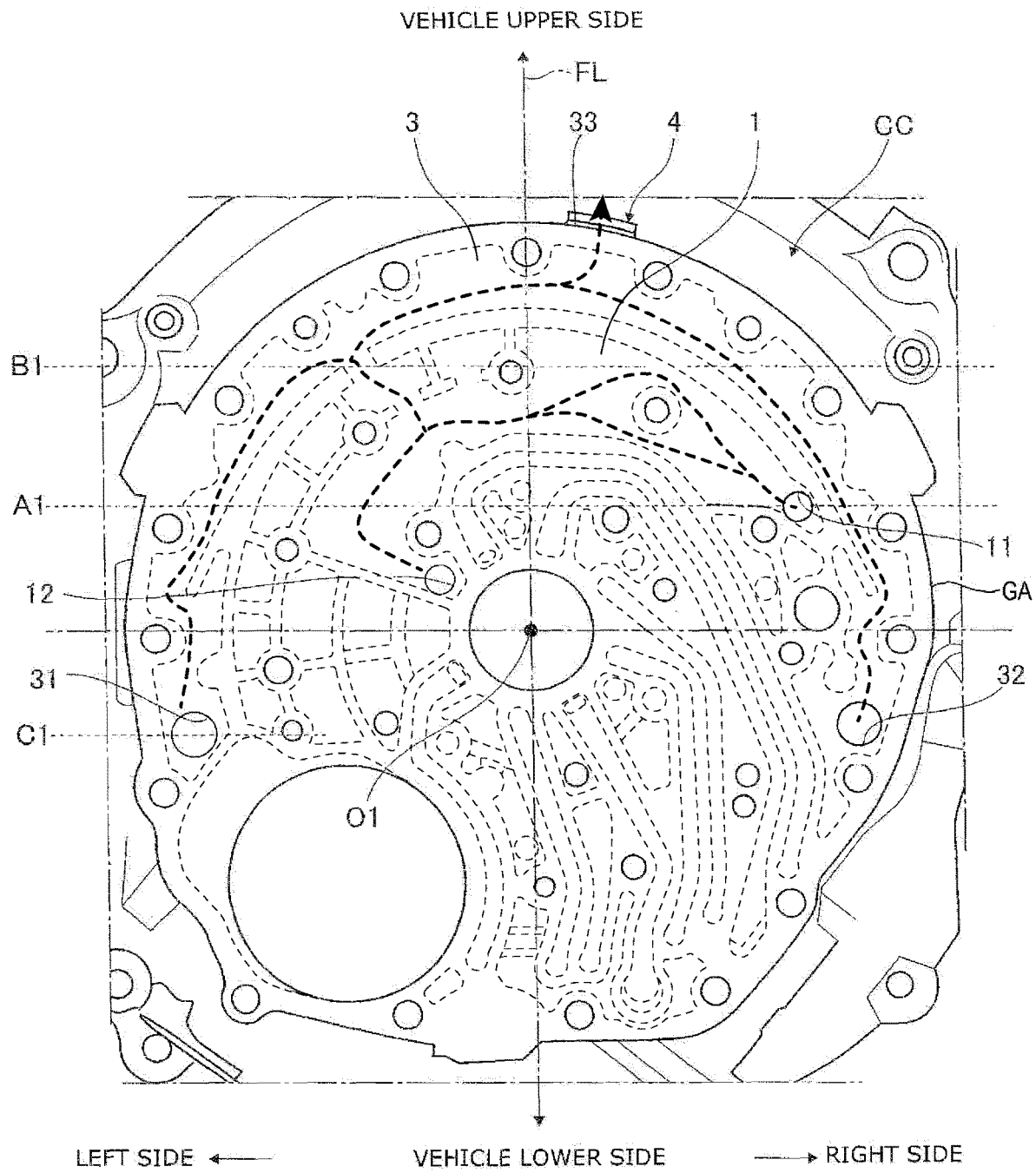
FIG. 3 is a front view showing a gasket provided on a converter cover according to an embodiment.

FIG. 2 is a front view showing the converter cover CC according to the embodiment, when viewed from a side of the air breather chamber. FIG. 3 is a front view showing the gasket GA on the converter cover CC. In FIGS. 2 and 3, O1 represents a rotation axis of the transmission. A vehicle upper side is defined by an upper side in the gravity direction. A vehicle lower side is defined by a lower side in the gravity direction. FL represents an imaginary surface extending in the gravidity direction, and passing through the rotation axis O1. A right side and a left side are defined in FIG. 2 with respect to the imaginary surface FL. In the embodiment, the right side and left side correspond to one side and the other side of a vehicle width direction. An oblique line region in FIG. 2 is a region which functions as the air breather chamber. A plurality of ribs are formed on the connection surface CC1 of the converter cover CC. The gasket GA closes the ribs so as to constitute the air breather chamber, and an oil passage arranged to supply a control hydraulic pressure to an axial hydraulic passage of the transmission, and so on. Circles shown by broken lines in FIG. 2 are through holes formed in the gasket GA. Moreover, bold arrows in FIG. 2 represent paths of the lubricating oil blowing out with the air.

The connection surface CC1 of the converter cover CC includes a first breather chamber 1, a connection chamber 2, and a second breather chamber 3. The first breather chamber 1 has a raised curve shape which is raised in the upward direction, and which extends across the imaginary surface FL between the left side and the right side of the imaginary surface FL. The first breather chamber 1 includes a first introduction hole 11 formed in the gasket GA on the right side of the first breather chamber 1. The first breather chamber 1 includes a first connection passage 21 positioned on the left side of the imaginary surface FL, and connected to the connection chamber 2. The first breather chamber 1 includes a first discharge hole 12 (corresponding to a third discharge hole described in claim 3) positioned on the left side of the imaginary surface FL below the first connection passage 21. The first discharge hole 12 is a through hole formed in the gasket GA, and arranged to discharge the lubricating oil introduced into the first breather chamber 1, into the transmission case TC.

The second breather chamber 3 has a raised curve shape which is raised in the upward direction, and which extends across the imaginary surface FL between the left side and the right side of the imaginary surface FL. The second breather chamber 3 is formed along the shape of the outer circumference of the converter cover CC. Upper and lower positions of left and right ends of the second breather chamber 3 are positioned below the rotation shaft O1. Accordingly, it is possible to use a wide area as the breather chamber, and thereby to handle the increase of the amount of the lubricating oil. The second breather chamber 3 is formed to surround an upper outer circumference of the first breather chamber 1. The second breather chamber 3 is positioned on the upper side in the converter cover CC in the gravity direction. The second breather chamber 3 includes a second connection passage 22 positioned on the left side of the imaginary surface FL, and connected to the connection chamber 2. The second breather chamber 3 includes a second discharge hole 31 (corresponding to a discharge hole described in claims) positioned on the left side of the imaginary surface FL below the rotation axis O1. The second discharge hole 31 is a through hole formed in the gasket GA, and arranged to discharge the lubricating oil introduced to the second breather chamber 3, into the transmission case TC.

The second breather chamber 3 includes an atmosphere communication hole 4 positioned near the imaginary surface FL on the right side of the imaginary surface FL, and connected to the outside of the converter cover CC. That is, the atmosphere communication hole 4 is disposed to be apart from the second connection passage 22 through the imaginary surface FL. The atmosphere communication hole 4 is disposed at a position which is farther than an uppermost position of the second breather chamber 3, when viewed from the second connection passage 22. An orifice (throttling) 33 is provided at the uppermost position of the second breather chamber 3. The orifice 33 is arranged to decrease a flow passage sectional area within the second breather chamber 3. The second breather chamber 3 includes a third discharge hole 32 (corresponding to a second discharge hole described in the claims) positioned on the right side of the imaginary surface FL below the rotation shaft O1. The third discharge hole 32 is a through hole formed in the gasket GA, and arranged to discharge the lubricating oil introduced into the second breather chamber 3, into the transmission case TC.

Next, operations are explained. A1 represents a position (that is, a height position) of the first introduction hole 11 in the upward and downward directions. B1 represents a position of the second connection passage 22 in the upward and downward directions. C1 represents a position of the second discharge hole 31 in the upward and downward directions. A1 and C1 are positioned below B1. Accordingly, when the lubricating oil is inserted from the first introduction hole 11 to the first breather chamber 1, the lubricating oil is moved in accordance with the movement of the air. Then, a part of the lubricating oil is guided at the first connection passage 21 to the first discharge hole 12 positioned below the first connection passage 21, and discharged from the first discharge hole 12.

On the other hand, the lubricating oil which is not guided to the first discharge hole 12 is introduced through the connection chamber 2 from the second connection passage 22 to the second breather chamber 3. At this time, the lubricating oil moving together with the air is restricted to be moved by the resistance of the connection chamber 2, relative to the movement within the first breather chamber 1.

Accordingly, the lubricating oil reaches the second connection passage 22 in this restricted state. Consequently, most of the lubricating oil is guided to the second discharge hole 31, and discharged from the second discharge hole 31. Moreover, the orifice 33 is disposed at the uppermost position. Therefore, the movements of the air and the lubricating oil are further restricted. Furthermore, the atmosphere communication hole 4 is positioned on the right side of the imaginary surface FL. Therefore, it is possible to ensure a distance from the second connection passage 22, and to sufficiently suppress the movement of the lubricating oil until the lubricating oil reaches the atmosphere communication hole 4. Moreover, the atmosphere communication hole 4 is positioned above B1. Accordingly, it is possible to avoid the lubricating oil from blowing out from the atmosphere communication hole 4.

In the air and the lubricating oil which passed through the orifice 33, the air is discharged from the atmosphere communication hole 4, and the residual lubricating oil is guided to the third discharge hole 32, and discharged from the third discharge hole 32. Moreover, the second breather chamber 3 has a volume greater than that of the first breather chamber 1. Accordingly, even when the amount of the lubricating oil flowing into the air breather chamber is increased, it is possible to discharge the lubricating oil to the transmission case TC side while effectively separating the air and the liquid.

As described above, it is possible to obtain the below described operations and effects in the embodiment.

(1) The air breather chamber structure according to the embodiment includes the first breather chamber 1 and the second breather chamber 3. The first breather chamber 1 is provided to the converter cover CC (the housing) receiving the transmission. The first breather chamber 1 includes the first introduction hole 11 connected with the inside of the transmission case TC (the housing). The second breather chamber 3 is provided to the upper portion of the converter cover CC in the gravity direction. The second breather chamber 3 includes the second connection passage 22 (the second introduction hole) connected to the first breather chamber 1, the atmosphere communication hole 4 connected to the outside of the converter cover CC, and the second discharge hole 31 (the discharge hole) connected to the inside of the transmission case TC to discharge the lubricating oil. The imaginary surface FL passing through the rotation axis O1 of the transmission, and extending in the gravity direction is defined. The first introduction hole 11 is positioned on the right side of the imaginary surface FL (the one side in the vehicle widthwise direction). The second connection passage 22 is positioned on the left side of the imaginary surface FL (the other side in the vehicle width direction). The atmosphere communication hole 4 is positioned on the right side of the imaginary surface FL (the one side in the vehicle widthwise direction). The second discharge hole 31 is positioned on the left side of the imaginary surface FL (the other side in the vehicle widthwise direction). The first introduction hole 11 and the second discharge hole 31 are positioned below the second connection passage 22 in the gravity direction. The atmosphere communication hole 4 is positioned above the second connection hole 22 in the gravity direction.

With this, it is possible to ensure the distance between the second introduction hole and the atmosphere communication hole, and to effectively attain the functions of the air breather chamber even when the amount of the lubricating oil is increased.

(2) The second breather chamber 3 has the curved shape raised in the upward direction of the gravity direction. The second breather chamber 3 includes the third discharge hole 32 (the second discharge hole) positioned on the right side (the one side in the vehicle widthwise direction) of the imaginary surface FL below the atmosphere communication hole 4 in the gravity direction, and connected to the inside of the transmission case TC to discharge the lubricating oil.

Accordingly, in the lubricating oil entering from the second connection passage 22, the lubricating oil moved through the lower side of the atmosphere communication hole 4 can be discharged into the inside of the transmission case TC.

(3) The first breather chamber 1 includes the first discharge hole 12 (the third discharge hole) positioned on the left side of the imaginary surface FL (the other side in the vehicle widthwise direction) below the second connection passage 22 in the gravity direction, and connected to the inside of the transmission case TC to discharge the lubricating oil.

Accordingly, it is possible to discharge the lubricating oil caught within the first breather chamber 1 to the inside of the transmission case TC, and to suppress the movement of the lubricating oil to the second breather chamber 3.

Hereinabove, the present invention is explained with reference to the embodiment. However, even when other configuration is employed, it is included in the present invention. In the embodiment, the air breather chamber is constituted by the converter cover and the gasket. For example, the air breather chamber may be constituted within the transmission case, or by using both the converter cover and the transmission case. Moreover, in the embodiment, the first introduction hole 11 and the atmosphere communication hole 4 are provided on the right side of the imaginary surface FL. The second connection passage 22 and the second discharge hole 31 are provided on the left side of the imaginary surface FL. However, it is optional to interchange the left and the right.

The invention claimed is:

1. An air breather chamber structure comprising:
    a first breather chamber integrally formed in a converter cover which connects to a transmission case of a housing;
    a first introduction hole formed in a gasket and connected to the first breather chamber and an inside of the transmission case of the housing;
    a second breather chamber integrally formed in the converter cover, and which includes a second introduction hole connected to the first breather chamber, and an atmosphere communication hole connected to an outside of the converter cover;
    a discharge hole formed in the gasket, and connected to the second breather chamber and the inside of the transmission case of the housing, and arranged to discharge lubricating oil,
    a first side being defined by a first side of the converter cover which passes through a rotation axis of the transmission and extends in a vertical direction;
    a second side being defined by a second side of the converter cover;
    the first introduction hole being positioned on the first side of the converter cover;
    the second introduction hole being positioned on the second side of the converter cover;
    the atmosphere communication hole being positioned on the first side of the converter cover,
    the discharge hole being positioned on the second side of the converter cover;
    the first introduction hole and the discharge hole being positioned below the second introduction hole in the vertical direction, and
    the atmosphere communication hole being positioned above the second introduction hole in the vertical direction.

2. The air breather chamber structure as claimed in claim 1, wherein the second breather chamber includes a curved shape
    raised in an upward direction of the vertical direction; and
    wherein a second discharge hole is formed in the gasket on the first side of the converter cover, below the atmosphere communication hole in the vertical direction, and
    wherein the second discharge hole is connected to the second breather chamber and the inside of the transmission case of the housing to discharge the lubricating oil.

3. The air breather chamber structure as claimed in claim 2, further comprising:
    a third discharge hole formed in the gasket on the second side of the converter cover below the second introduction hole in the vertical direction,
    wherein the third discharge hole is connected to the first breather chamber and the inside of the transmission case of the housing to discharge the lubricating oil.

* * * * *